US006958680B2

(12) United States Patent
Kline

(10) Patent No.: US 6,958,680 B2
(45) Date of Patent: Oct. 25, 2005

(54) POWER LINE COMMUNICATION SYSTEM AND METHOD OF USING THE SAME

(75) Inventor: Paul A. Kline, Gaithersburg, MD (US)

(73) Assignee: Current Technologies, LLC, Germantown, MD (US)

(*) Notice: Subject to any disclaimer, the term of this patent is extended or adjusted under 35 U.S.C. 154(b) by 343 days.

(21) Appl. No.: 09/835,532

(22) Filed: Apr. 16, 2001

(65) Prior Publication Data

US 2001/0054953 A1 Dec. 27, 2001

Related U.S. Application Data

(60) Provisional application No. 60/197,615, filed on Apr. 14, 2000.

(51) Int. Cl.[7] ........ H04M 11/04

(52) U.S. Cl. ........ 340/310.01; 340/310.02; 340/310.03; 340/310.07; 340/310.08

(58) Field of Search ........ 340/310.01, 310.02, 340/310.03, 310.05, 310.06, 310.07, 310.08, 870.03, 870.07; 725/116; 700/291; 375/257, 350, 258, 259; 455/3.1, 3.3, 3.6

(56) References Cited

U.S. PATENT DOCUMENTS

| | | | | |
|---|---|---|---|---|
| 2,298,435 A | 10/1942 | Tunick | 455/14 |
| 3,445,814 A | 5/1969 | Spalti | 340/870.02 |
| 3,605,009 A | 9/1971 | Enge | 323/293 |
| 3,641,536 A | 2/1972 | Prosprich | 340/870.15 |
| 3,656,112 A | 4/1972 | Paull | 340/870.02 |
| 3,701,057 A | 10/1972 | Hoer | 333/112 |
| 3,702,460 A | 11/1972 | Blose | 340/310.02 |

(Continued)

FOREIGN PATENT DOCUMENTS

| | | |
|---|---|---|
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 100 26 930 C2 | 1/2003 |
| DE | 100 26 931 C2 | 1/2003 |

(Continued)

OTHER PUBLICATIONS

U.S. Appl. No. 10/293,799, filed Nov. 13, 2002, Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.
Power Line Communications Conference entitled, "PLC, A New Competitor in Broadband Internet Access," Dec. 11–12, 2001, Washington, D.C., 60 pages.

(Continued)

*Primary Examiner*—Van T. Trieu
(74) *Attorney, Agent, or Firm*—Mel Barnes; Manelli Denison & Selter PLLC

(57) ABSTRACT

The last portion of the electrical distribution system is used to provide high-speed communications to residential homes. An aggregation point interfaces a medium voltage power line with a point-of-presence, and a power line bridge enables flow of communications signals between the medium voltage power line and a low voltage power line across a distribution transformer.

49 Claims, 3 Drawing Sheets

U.S. PATENT DOCUMENTS

| | | | | | |
|---|---|---|---|---|---|
| 3,810,096 | A | | 5/1974 | Kabat et al. | 340/310.07 |
| 3,895,370 | A | | 7/1975 | Valentini | 340/310.07 |
| 3,900,842 | A | * | 8/1975 | Calabro et al. | 340/310.03 |
| 3,942,170 | A | | 3/1976 | Whyte | 340/310.07 |
| 3,962,547 | A | | 6/1976 | Pattantyus-Abraham | 340/310.06 |
| 3,964,048 | A | | 6/1976 | Lusk et al. | 340/310.03 |
| 3,973,240 | A | | 8/1976 | Fong | 340/310.06 |
| 4,004,110 | A | | 1/1977 | Whyte | 340/310.07 |
| 4,004,257 | A | | 1/1977 | Geissler | 333/207 |
| 4,012,733 | A | | 3/1977 | Whyte | 30/310.05 |
| 4,016,429 | A | | 4/1977 | Vercellotti et al. | 307/149 |
| 4,017,845 | A | | 4/1977 | Kilian et al. | 340/310.02 |
| 4,053,876 | A | | 10/1977 | Taylor | 340/529 |
| 4,057,793 | A | | 11/1977 | Johnson et al. | 340/310.07 |
| 4,060,735 | A | | 11/1977 | Pascucci et al. | 307/3 |
| 4,070,572 | A | | 1/1978 | Summerhayes | 398/209 |
| 4,142,178 | A | | 2/1979 | Whyte et al. | 340/310.06 |
| 4,188,619 | A | | 2/1980 | Perkins | 340/310.05 |
| 4,239,940 | A | | 12/1980 | Dorfman | 340/310.06 |
| 4,250,489 | A | | 2/1981 | Dudash et al. | 340/147 T |
| 4,254,402 | A | | 3/1981 | Perkins | 340/310.07 |
| 4,263,549 | A | | 4/1981 | Toppeto | 324/127 |
| 4,323,882 | A | | 4/1982 | Gajjar | 340/310.05 |
| 4,357,598 | A | | 11/1982 | Melvin, Jr. | 340/310.07 |
| 4,386,436 | A | | 5/1983 | Kocher et al. | 455/151.4 |
| 4,408,186 | A | | 10/1983 | Howell | 340/310.07 |
| 4,413,250 | A | | 11/1983 | Porter et al. | 340/310.03 |
| 4,433,284 | A | | 2/1984 | Perkins | 340/310.05 |
| 4,442,492 | A | | 4/1984 | Karlsson et al. | 705/412 |
| 4,457,014 | A | | 6/1984 | Bloy | 381/98 |
| 4,473,816 | A | | 9/1984 | Perkins | 340/310.05 |
| 4,473,817 | A | | 9/1984 | Perkins | 340/310.05 |
| 4,481,501 | A | | 11/1984 | Perkins | 340/310.07 |
| 4,504,705 | A | | 3/1985 | Pilloud | 381/77 |
| 4,569,045 | A | | 2/1986 | Schieble et al. | 370/85 |
| 4,636,771 | A | | 1/1987 | Ochs | 340/310.05 |
| 4,638,298 | A | | 1/1987 | Spiro | 370/392 |
| 4,642,607 | A | | 2/1987 | Strom et al. | 340/310.07 |
| 4,644,321 | A | | 2/1987 | Kennon | 340/310.07 |
| 4,652,855 | A | | 3/1987 | Weikel | 340/310.02 |
| 4,668,934 | A | | 5/1987 | Shuey | 340/310.06 |
| 4,675,648 | A | | 6/1987 | Roth et al. | 340/310.07 |
| 4,683,450 | A | | 7/1987 | Max et al. | 333/202 |
| 4,686,382 | A | | 8/1987 | Shuey | 307/149 |
| 4,697,166 | A | | 9/1987 | Warnagiris et al. | 340/310.03 |
| 4,724,381 | A | | 2/1988 | Crimmins | 324/127 |
| 4,745,391 | A | | 5/1988 | Gajjar | 340/310.07 |
| 4,746,897 | A | | 5/1988 | Shuey | 340/310.06 |
| 4,749,992 | A | | 6/1988 | Fitzemeyer et al. | 340/870.02 |
| 4,766,414 | A | | 8/1988 | Shuey | 340/310.05 |
| 4,800,363 | A | | 1/1989 | Braun et al. | 340/310.02 |
| 4,815,106 | A | * | 3/1989 | Propp et al. | 375/257 |
| 4,890,089 | A | | 12/1989 | Shuey | 340/310.07 |
| 4,903,006 | A | | 2/1990 | Boomgaard | 340/310.05 |
| 4,904,996 | A | | 2/1990 | Fernandes | 340/870.07 |
| 4,962,496 | A | | 10/1990 | Vercellotti et al. | 370/204 |
| 4,973,940 | A | | 11/1990 | Sakai et al. | 340/310.02 |
| 5,006,846 | A | | 4/1991 | Granville et al. | 340/870.28 |
| 5,066,939 | A | | 11/1991 | Mansfield, Jr. | 340/310 R |
| 5,132,992 | A | | 7/1992 | Yurt et al. | 375/240 |
| 5,148,144 | A | | 9/1992 | Sutterlin et al. | 340/310.01 |
| 5,185,591 | A | | 2/1993 | Shuey | 340/310.02 |
| 5,191,467 | A | | 3/1993 | Kapany et al. | 359/337 |
| 5,210,519 | A | | 5/1993 | Moore | 340/310.06 |
| 5,257,006 | A | | 10/1993 | Graham et al. | 340/310.06 |
| 5,264,823 | A | | 11/1993 | Stevens | 340/310.04 |
| 5,272,462 | A | * | 12/1993 | Teyssandier et al. | 340/310.01 |
| 5,301,208 | A | | 4/1994 | Rhodes | 375/36 |
| 5,341,265 | A | | 8/1994 | Westrom et al. | 361/44 |
| 5,369,356 | A | | 11/1994 | Kinney et al. | 324/142 |
| 5,406,249 | A | | 4/1995 | Pettus | 340/310.06 |
| 5,410,720 | A | | 4/1995 | Osterman | 725/150 |
| 5,426,360 | A | | 6/1995 | Maraio et al. | 324/126 |
| 5,448,229 | A | | 9/1995 | Lee, Jr. | 340/870.02 |
| 5,481,249 | A | | 1/1996 | Sato | 340/2.1 |
| 5,485,040 | A | | 1/1996 | Sutterlin | 307/3 |
| 5,497,142 | A | | 3/1996 | Chaffanjon | 340/310.06 |
| 5,498,956 | A | | 3/1996 | Kinney et al. | 324/142 |
| 5,533,054 | A | | 7/1996 | DeAndrea et al. | 375/286 |
| 5,537,087 | A | | 7/1996 | Naito | 336/92 |
| 5,559,377 | A | | 9/1996 | Abraham | 307/104 |
| 5,568,185 | A | | 10/1996 | Yoshikazu | 348/22 |
| 5,579,221 | A | | 11/1996 | Mun | 364/188 |
| 5,592,354 | A | | 1/1997 | Nocentino, Jr. et al. | 361/69 |
| 5,592,482 | A | | 1/1997 | Abraham | 348/8 |
| 5,598,406 | A | | 1/1997 | Albrecht et al. | 370/296 |
| 5,616,969 | A | | 4/1997 | Morava | 307/91 |
| 5,625,863 | A | | 4/1997 | Abraham | 340/310.01 |
| 5,630,204 | A | * | 5/1997 | Hylton et al. | 725/116 |
| 5,684,450 | A | | 11/1997 | Brown | 340/310.02 |
| 5,691,691 | A | | 11/1997 | Merwin et al. | 340/310.02 |
| 5,705,974 | A | | 1/1998 | Patel et al. | 340/310.08 |
| 5,712,614 | A | | 1/1998 | Patel et al. | 340/310.03 |
| 5,717,685 | A | | 2/1998 | Abraham | 340/310.01 |
| 5,726,980 | A | | 3/1998 | Rickard | 370/293 |
| 5,748,104 | A | | 5/1998 | Argyroudis et al. | 340/870.11 |
| 5,751,803 | A | | 5/1998 | Shpater | 379/379 |
| 5,770,996 | A | | 6/1998 | Severson et al. | 340/310.08 |
| 5,777,545 | A | | 7/1998 | Patel et al. | 341/310.06 |
| 5,778,116 | A | | 7/1998 | Tomich | 385/16 |
| 5,796,607 | A | | 8/1998 | Le Van Suu | 364/140.01 |
| 5,798,913 | A | | 8/1998 | Tiesinga et al. | 363/21.13 |
| 5,805,053 | A | | 9/1998 | Patel et al. | 340/310.01 |
| 5,805,458 | A | | 9/1998 | McNamara et al. | 702/60 |
| 5,818,127 | A | | 10/1998 | Abraham | 307/106 |
| 5,828,293 | A | | 10/1998 | Rickard | 340/310.04 |
| 5,835,005 | A | | 11/1998 | Furukawa et al. | 340/310.01 |
| 5,850,114 | A | | 12/1998 | Froidevaux | 307/105 |
| 5,856,776 | A | * | 1/1999 | Armstrong et al. | 340/310.01 |
| 5,870,016 | A | | 2/1999 | Shrestha | 340/310.01 |
| 5,892,430 | A | | 4/1999 | Wiesman et al. | 340/310.01 |
| 5,933,071 | A | | 8/1999 | Brown | 340/310.01 |
| 5,933,073 | A | | 8/1999 | Shuey | 340/310.07 |
| 5,949,327 | A | * | 9/1999 | Brown | 340/310.01 |
| 5,952,914 | A | | 9/1999 | Wynn | 340/310.01 |
| 5,977,650 | A | | 11/1999 | Rickard et al. | 340/310.01 |
| 5,978,371 | A | | 11/1999 | Mason, Jr. et al. | 370/389 |
| 5,982,276 | A | | 11/1999 | Stewart | 340/310.01 |
| 5,994,998 | A | * | 11/1999 | Fisher et al. | 340/310.01 |
| 5,994,999 | A | | 11/1999 | Ebersohl | 340/310.03 |
| 6,014,386 | A | | 1/2000 | Abraham | 340/310.01 |
| 6,023,106 | A | | 2/2000 | Abraham | 307/3 |
| 6,037,857 | A | | 3/2000 | Behrens et al. | 340/340.03 |
| 6,040,759 | A | * | 3/2000 | Sanderson | 340/310.06 |
| 6,091,932 | A | | 7/2000 | Langlais | 455/5.1 |
| 6,104,707 | A | | 8/2000 | Abraham | 370/295 |
| 6,121,765 | A | | 9/2000 | Carlson | 323/359 |
| 6,130,896 | A | | 10/2000 | Lueker et al. | 370/469 |
| 6,140,911 | A | | 10/2000 | Fisher et al. | 340/310.01 |
| 6,141,634 | A | | 10/2000 | Flint et al. | 703/18 |
| 6,144,292 | A | | 11/2000 | Brown | 340/310.02 |
| 6,151,330 | A | | 11/2000 | Liberman | 370/449 |
| 6,154,488 | A | | 11/2000 | Hunt | 375/219 |
| 6,157,292 | A | | 12/2000 | Piercy et al. | 340/310.01 |
| 6,172,597 | B1 | | 1/2001 | Brown | 340/310.02 |
| 6,175,860 | B1 | | 1/2001 | Gaucher | 709/208 |
| 6,177,849 | B1 | | 1/2001 | Barsellotti et al. | 333/177 |
| 6,212,658 | B1 | | 4/2001 | Le Van Suu | 714/749 |
| 6,229,434 | B1 | | 5/2001 | Knapp et al. | 340/310.01 |
| 6,239,722 | B1 | | 5/2001 | Colton et al. | 340/870.02 |

| | | | | |
|---|---|---|---|---|
| 6,243,413 | B1 | 6/2001 | Beukema | 375/222 |
| 6,243,571 | B1 | 6/2001 | Bullock et al. | 455/402 |
| 6,255,805 | B1 | 7/2001 | Papalia et al. | 323/207 |
| 6,255,935 | B1 | 7/2001 | Lehmann et al. | 340/310.07 |
| 6,275,144 | B1 | 8/2001 | Rumbaugh | 340/310.01 |
| 6,297,730 | B1 | 10/2001 | Dickinson | 340/310.01 |
| 6,300,881 | B1 * | 10/2001 | Yee et al. | 340/870.02 |
| 6,313,738 | B1 | 11/2001 | Wynn | 340/310.03 |
| 6,317,031 | B1 | 11/2001 | Rickard | 340/310.03 |
| 6,331,814 | B1 | 12/2001 | Albano et al. | 340/310.01 |
| 6,335,672 | B1 | 1/2002 | Tumlin et al. | 336/175 |
| 6,373,376 | B1 | 4/2002 | Adams et al. | 340/310.01 |
| 6,384,580 | B1 | 5/2002 | Ochoa et al. | 323/207 |
| 6,396,391 | B1 | 5/2002 | Binder | 340/310.01 |
| 6,396,392 | B1 | 5/2002 | Abraham | 340/310.01 |
| 6,404,773 | B1 | 6/2002 | Williams et al. | 370/463 |
| 6,407,987 | B1 | 6/2002 | Abraham | 370/295 |
| 6,414,578 | B1 | 7/2002 | Jitaru | 336/170 |
| 6,417,762 | B1 | 7/2002 | Comer | 340/310.01 |
| 6,425,852 | B1 | 7/2002 | Epstein et al. | 600/13 |
| 6,441,723 | B1 | 8/2002 | Mansfield, Jr. et al. | 340/310.01 |
| 6,449,318 | B1 | 9/2002 | Rumbaugh | 375/309 |
| 6,452,482 | B1 | 9/2002 | Cern | 340/310.01 |
| 6,480,510 | B1 | 11/2002 | Binder | 370/502 |
| 6,486,747 | B1 | 11/2002 | DeCramer et al. | 333/25 |
| 6,492,897 | B1 | 12/2002 | Mowery, Jr. | 340/310.01 |
| 6,496,104 | B2 | 12/2002 | Kline | 340/310.01 |
| 6,504,357 | B1 | 1/2003 | Hemminger et al. | 340/310.01 |
| 6,507,573 | B1 | 1/2003 | Brandt et al. | 370/335 |
| 6,515,485 | B1 | 2/2003 | Bullock et al. | 324/601 |
| 6,522,626 | B1 | 2/2003 | Greenwood | 370/208 |
| 6,549,120 | B1 | 4/2003 | deBuda | 340/310.01 |
| 6,577,231 | B2 | 6/2003 | Litwin, Jr. et al. | 340/310.01 |
| 6,590,493 | B1 | 7/2003 | Rasimas et al. | 340/310.01 |
| 6,611,134 | B2 | 8/2003 | Chung | 324/74 |
| 6,650,249 | B2 | 11/2003 | Meyer et al. | 340/870.02 |
| 6,667,685 | B2 | 12/2003 | Wasaki et al. | 340/310.03 |
| 6,668,058 | B2 | 12/2003 | Grimes | 379/322 |
| 6,686,832 | B2 | 2/2004 | Abraham | 340/310.01 |
| 6,785,532 | B1 | 8/2004 | Rickard | 455/402 |
| 6,785,592 | B1 * | 8/2004 | Smith et al. | 700/291 |
| 6,788,745 | B1 | 9/2004 | Lim et al. | 375/297 |
| 2001/0038329 | A1 | 11/2001 | Diamanti et al. | 340/310.01 |
| 2001/0038343 | A1 | 11/2001 | Meyer et al. | 340/870.02 |
| 2001/0045888 | A1 | 11/2001 | Kline | 340/310.01 |
| 2001/0052843 | A1 | 12/2001 | Wiesman et al. | 340/310.01 |
| 2001/0054953 | A1 | 12/2001 | Kline | 340/310.01 |
| 2002/0002040 | A1 | 1/2002 | Kline et al. | 455/402 |
| 2002/0010870 | A1 | 1/2002 | Gardner | 713/300 |
| 2002/0014884 | A1 | 2/2002 | Chung | 324/74 |
| 2002/0041228 | A1 | 4/2002 | Zhang | 340/310.01 |
| 2002/0048368 | A1 | 4/2002 | Gardner | 380/277 |
| 2002/0060624 | A1 | 5/2002 | Zhang | 340/310.01 |
| 2002/0071452 | A1 | 6/2002 | Abraham | 370/480 |
| 2002/0080010 | A1 | 6/2002 | Zhang | 340/310.06 |
| 2002/0095662 | A1 | 7/2002 | Ashlock et al. | 717/136 |
| 2002/0098867 | A1 | 7/2002 | Meiksen et al. | 455/560 |
| 2002/0105413 | A1 | 8/2002 | Cern | 340/310.01 |
| 2003/0090368 | A1 | 5/2003 | Ide | 340/310.06 |
| 2003/0103307 | A1 | 6/2003 | Dostert | 361/113 |
| 2003/0107477 | A1 | 6/2003 | Ide | 340/310.01 |
| 2003/0149784 | A1 | 8/2003 | Ide | 709/231 |

FOREIGN PATENT DOCUMENTS

| | | | |
|---|---|---|---|
| DE | 100 42 958 | C2 | 1/2003 |
| EP | 0 581 351 | A1 | 2/1994 |
| EP | 0 632 602 | A2 | 1/1995 |
| EP | 0 470 185 | B1 | 11/1995 |
| EP | 0 822 721 | A3 | 2/1998 |
| EP | 0 822 721 | A2 | 2/1998 |
| EP | 0 933 883 | A3 | 8/1999 |
| EP | 0 933 883 | A2 | 8/1999 |
| EP | 0 948 143 | A2 | 10/1999 |
| EP | 1 011 235 | A2 | 6/2000 |
| EP | 1 014 640 | A2 | 6/2000 |
| EP | 1 043 866 | A2 | 10/2000 |
| EP | 1 043 866 | A3 | 10/2000 |
| EP | 1 075 091 | A1 | 2/2001 |
| EP | 0 916 194 | B1 | 9/2001 |
| EP | 1 011 235 | A3 | 5/2002 |
| EP | 1 213 849 | A1 | 6/2002 |
| EP | 1 217 760 | A1 | 6/2002 |
| EP | 1 014 640 | A3 | 7/2002 |
| EP | 1 021 866 | B1 | 10/2002 |
| EP | 1 251 646 | A2 | 10/2002 |
| EP | 1 253 699 | A2 | 10/2002 |
| ES | 2 122 920 | A1 | 12/1998 |
| GB | 2 293 950 | A | 4/1996 |
| GB | 2 315 937 | A | 2/1998 |
| GB | 2 331 683 | A | 5/1999 |
| GB | 2 342 264 | A | 4/2000 |
| GB | 2 347 601 | A | 9/2000 |
| JP | 1276933 | | 11/1989 |
| NZ | 276741 | | 7/1998 |
| WO | 95/29536 | A1 | 11/1995 |
| WO | 98/40980 | A1 | 9/1998 |
| WO | 99/59261 | A1 | 11/1999 |
| WO | 99/59261 | | 11/1999 |
| WO | 00/16496 | | 3/2000 |
| WO | 00/16496 | A2 | 3/2000 |
| WO | 00/59076 | A1 | 10/2000 |
| WO | 00/60701 | A1 | 10/2000 |
| WO | 00/60822 | | 10/2000 |
| WO | 00/60822 | A1 | 10/2000 |
| WO | 01/08321 | | 2/2001 |
| WO | 01/08321 | A1 | 2/2001 |
| WO | WO 01/08321 | A1 | 2/2001 |
| WO | 01/43305 | A1 | 6/2001 |
| WO | 01/50625 | A2 | 7/2001 |
| WO | 01/50625 | A3 | 7/2001 |
| WO | 01/50628 | A1 | 7/2001 |
| WO | 01/50629 | A1 | 7/2001 |
| WO | 01/63787 | A1 | 8/2001 |
| WO | 01/82497 | A1 | 11/2001 |
| WO | 02/17509 | A1 | 2/2002 |
| WO | 02/37712 | A1 | 5/2002 |
| WO | 02/054605 | A1 | 7/2002 |
| WO | 02/065684 | A2 | 8/2002 |

OTHER PUBLICATIONS

Rivkin, S. R., "Co–Evolution of Electric & Telecommunications Networks," *The Electricity Journal,* May 1998, 71–76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Consulting, Jul. 16, 2002, 5 pages.

"Embedded Power Line Carrier Modem," Archnet Electronic Technology, http://www.archnetco.com/english/product/ATL90.htm, 2001, 3 pages.

"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low–Voltage Electrical Installations in the Frequency Band 3kHz to 148.5kHz–Part 4: Filters at the Interface of the Indoor and Outdoor Electricity Network", *CLC SC 105A* (*Secretariat*) May 1992, 62, 1–11.

"Intellon Corporation Test Summary for Transformerless Coupler Study", *Intellon No News Wires,* Dec. 24, 1998, DOT/NHTSA Order No. DTNH22–98–P–07632, pp 1–18.

Emetcon *Automated Distribution System,* ABB Power T & D Company, Inc., Jan. 1990, Raleigh, North Carolina, No. B–919A, 14 pages.

"Dedicated Passive Backbone for Power Line Communications", *IBM Technical Disclosure Bulletin,* Jul. 1997, 40(7), 183–185.

Coaxial Feeder Cables [Engineering Notes], *PYE Telecommunications Limited Publication Ref No. TSP507/1,* Jun. 1975, Cambridge, England, 15 pages.

"Centralized Commercial Building Applications with the Lonworks ® PLT–21 Power Line Tranceiver", *Lonworks Engineering Bulletin,* Echelon, Apr. 1997, pp 1–22.

"Plexeon Logistics, Inc., Power Line Communications", www.plexeon.com/power.html, 2 pages.

"EMETCON Automated Distribution System: Communications Guide", *Westinghouse ABB Power T & D Company Technical Manual 42–6001A,* Sep. 1989, 55 pages.

Abraham, K.C. et al., "A Novel High–Speed PLC Communication Modem", *IEEE Transactions on Power Delivery,* 1992, 7(4), 1760–1768.

J.M. Barstow., "A Carrier Telephone System for Rural Service", *AIEE Transactions,* 1947, 66, 301–307.

Chang, S.S.L., "Power–Line Carrier", *Fundamentals Handbook of Electrical and Computer Engineering*, vol. II–Communication, Control, Devices and Systems, John Wiley & Sons, 617–627.

Chen, Y–F. et al. "Baseband Transceiver Design of a 128–Kbps Power–Line Modem for Household Applications", *IEEE Transactions on Power Delivery,* 2002, 17(2), 338–344.

Coakley, N.G. et al., "Real–Time Control of a Servosytem Using the Inverter–Fed Power Lines to Communicate Sensor Feedback", *IEEE Transactions on Industrial Electronics,* 1999, 46(2), 360–369.

Esmailian, T. et al., "A Discrete Multitone Power Line Communication System", *Department of Electrical and Computer Engineering,* University of Toronto, Ontario Canada, 2000 IEEE, pp 2953–2956.

Kawamura, A. et al., "Autonomous Decentralized Manufacturing System Using High–speed Network with Inductive Transmission of Data and Power", *IEEE,* 1996, 940–945.

Kilbourne, B. "EEI Electric Perspectives: The Final Connection", www.eei.org/ep/editorial/Jul–01/0701conenct.htm, 7 pages.

Kim, W–O., et al., "A Control Network Architecture Based on EIA–709.1 Protocol for Power Line Data Communications", *IEEE Transactions on Consumer Electronics,* 2002, 48(3), 650–655.

Lim, C.K. et al., "Development of a Test Bed for High–Speed Power Line Communications", School of Electrical and Electronic Engineering, Nanyang Technological University, Singapore, *IEEE,* 2000, 451–456.

Lokken, G. et al., "The Proposed Wisconsin electric Power Company Load Management System Using Power Line Carrier Over Distribution Lines", *1976 National Telecommunications Conference, IEEE,* 1976, 2.2–12.2–3.

Marthe, E. et al., "Indoor Radiated Emission Associated with Power Line Communication Systems", *Swiss Federal Institute of Technology Power Systems Laboratory IEEE,* 2001, 517–520.

Naredo, J.L. et al., "Design of Power Line Carrier Systems on Multitransposed Delta Transmission Lines", *IEEE Transactions on Power Delivery,* 1991, 6(3), 952–958.

Nichols, K., "Build a Pair of Line–Carrier Modems", *CRC Electronics–Radio Electronics,* 1988, 87–91.

Okazaki, H, et al., "A Transmitting, A Receiving Method for CDMA Communications Over Indoor Electrical Power Lines", *IEEE,* 1998, pp VI–522–VI–528.

B. Don Russell, "Communication Alternatives for Distribution Metering and Load Management", *IEEE Transactions on Power Apparatus and Systems,* 1980, vol. PAS–99(4), pp 1448–1455.

Sado, WN. et al., "Personal Communication on Residential Power Lines– Assessment of Channel Parameters", *IEEE,* 532–537.

International Search Report dated Jun. 24, 2002, from PCT/US02/04310.

International Search Report dated Aug. 7, 2002, from PCT/US02/04300.

U.S. Appl. No. 09/912,633, filed Jul. 25, 2001, Kline.

U.S. Appl. No. 09/915,459, filed Jul. 26, 2001, Kline.

LONWORKS Engineering Bulletin, "Demand Side Management with LONWORKS® Power Line Transceivers," Dec. 1996, 36 pages.

HomePlug™Powerline Alliance, HomePlug Initial Draft Medium Interface Specification, May 19, 2000, 109 pages.

HomePlug™Powerline Alliance, HomePlug 0.5 Draft Medium Interface Specification, Nov. 28, 2000, 133 pages.

HomePlug™Powerline Alliance, HomePlug Initial Draft Medium Interface Specification, Jul. 27, 2000, 109 pages.

HomePlug™Powerline Alliance, HomePlug 1.01 Specification, Dec. 1, 2001, 139 pages.

Summary of an IEEE Guide for Power–Line Carrier Applications, A Report by the Power System Communications Committee, *IEEE Transactions on Power Apparatus and Systems,* vol. PAS–99, No. 6, Nov./Dec. 1980.

De Wilde, W. R. et al., "Upwards to a Reliable Bi–Directional Communication Link on the LV Power Supplies for Utility Services: Field Tests in Belgium," pp. 168–172.

Tanaka, M., "Transmission Characteristics of a Power Line Used for Data Communications at High Frequencies," IEEE Transactions on Consumer Electronics, Feb. 1989, vol. 35, No. 1, pp. 37–42.

Hasler, E. F. et al., "Communication Systems Using Bundle Conductor Overhead Power Lines," IEEE Transactions on Power Apparatus and Systems, Mar./Apr. 1975, vol. PAS–94, No. 2, pp. 344–349.

IEEE Guide for Power–Line Carrier Applications, ANSI/IEEE Std 643–1980, ©1980 by The Institute of Electrical and Electronics Engineers, Inc., pp. 1–80.

Hatori, M. et al., "Home Informatization and Standardization of Home Bus," IEEE Transactions on Consumer Electronics, Aug. 1986, vol. CE–32, No. 3, pp. 542–549.
Hunt, J. M. et al., "Electrical Energy Monitoring and Control System for the Home," IEEE Transactions on Consumer Electronics, Aug. 1986, vol. CE–32, No. 3, pp. 578–583.
Gutzwiller, F. W. et al., "Homenet: A Control Network for Consumer Applications," IEEE Transactions on Consumer Electronics, Aug. 1983, vol. CE–29, No. 3, pp. 297–304.
Burrascano, P. et al., "Digital Signal Transmission on Power Line Carrier Channels: An Introduction," IEEE Transactions on Power Delivery, Jan. 1987, vol. PWRD–2, No. 1, pp. 50–56.
Burr, A. G. et al., "Effect of HF Broadcast Interference on PowerLine Telecommunications Above 1 Mhz," ©1998 IEEE, pp. 2870–2875.
Onunga, J. et al., "Distribution Line Communicaitons Using CSMA Access Control with Priority Acknowledgements," IEEE Transactions on Power Delivery, Apr. 1989, vol. 4, No. 2, pp. 878–886.
Tanaka, M., "High Frequency Noise Power Spectrum, Impedance and Transmission Loss of Power Line in Japan on Intrabuilding Power Line Communications," IEEE Transactions on Consumer Electronics, May 1988, vol. 34, No. 2, pp. 321–326.
Meng, H. et al., "A Transmission Line Model for High–Frequency Power Line Communication Channel," ©2002 IEEE, pp. 1290–1295.
Burrascano, P. et al., "Performance Evaluation of Digital Signal Transmission Channels on Coronating Power Lines," ©1988 IEEE, pp. 365–368.
DiClementi, D. A. et al., "Electrical Distribution System Power Line Characterization," ©1996 IEEE, pp. 271–276.
Abraham, K. C. et al., "A Novel High–Speed PLC Communication Modem," IEEE Transactions on Power Delivery, Oct. 1992, vol. 7, No. 4, pp. 1760–1768.
Yoshitoshi, M. et al., "Proposed Interface Specifications for Home Bus," IEEE Transactions on Consumer Electronics, Aug. 1986, vol. CE–32, No. 3, pp. 550–557.
O'Neal, Jr., J. B., "The Residential Power Circuit as a Communication Medium," IEEE Transactions on Consumer Electronics, Aug. 1986, vol. CE–32, No. 3, pp. 567–577.
Written Opinion dated Aug. 20, 2003, from PCT/US02/04310.
Dostert, K., "EMC Aspects of High Speed Powerline Communications," Proceedings of the 15$^{th}$ International Wroclaw Symposium and Exhibition on Electromagnetic Capability, Jun. 27–30, 2000; Wroclaw, Poland, pp. 98–102.
Dostert, K., Powerline Communications, Ch. 5, pp. 286–292, Prentice Hall PTR, Upper Saddle River, NJ ©2001.
Piety, R. A., "Intrabuilding Data Transmission Using Power–Line Wiring," Hewlett–Packard Journal, May 1987, pp. 35–40.
Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31–Apr. 2, 2004] 6 pages.

* cited by examiner

POWER LINE COMMUNICATION SYSTEM AND METHOD OF USING THE SAME

CROSS REFERENCE TO RELATED APPLICATIONS

1. This application claims priority under 35 U.S.C. §119 (e) from provisional application No. 60/197,615, filed Apr. 14, 2000. The 60/197,615 provisional application is incorporated by reference herein, in its entirety, for all purposes.

INTRODUCTION

2. The present invention relates generally to the field of digital communications. More particularly, the present invention relates to transmission of digital information via power lines.

BACKGROUND OF THE INVENTION

3. Referring to FIG. 1, a typical electric power distribution system having half loops 10 is illustrated. These half loops 10 are fed medium voltage (MV) power from the sub station. Medium voltage is in the tens of kilovolts range. A typical configuration has transformers 20 that step MV power down to low voltage (LV) power, low voltage being between 100 and 240 VAC. Each transformer 20 will typically feed LV power to several customers 30.

4. The half loop 10 uses cable that is either underground, which feeds pad-mounted transformers, or aerial cable, which feeds pole-mounted transformers. The transformers 20 step the MV down to LV. These transformers 20 are designed to work at very low frequencies (50–60 Hz typical) and do not allow high frequencies (greater than 100 KHz) to pass through. Each transformer 20 supplies several homes to the home electric utility meter 32, which is typically mounted on the outside of the home. Within the home, concentrated at the breaker panel 34, a web of electrical wires delivers the power to the outlets 36.

5. What is needed is a way to use this topology to deliver high-speed communications to residential homes in a cost effective way. Applications for such communication systems include high speed Internet, telephony, video conferencing and video delivery.

SUMMARY OF THE INVENTION

6. It is an object of the present invention to provide high-speed communications via an electrical distribution MV to LV topology.

7. It is another object of the present invention to provide high-speed Internet service via an electrical distribution MV to LV topology.

8. It is yet another object of the present invention to provide telephone and fax service via an electrical distribution MV to LV topology.

9. It is still another object of the present invention to provide video conferencing service via an electrical distribution MV to LV topology.

10. It is a further object of the present invention to provide video delivery via an electrical distribution MV to LV topology.

11. It is a further object of the present invention to provide residential and business security services via an electrical distribution MV to LV topology.

12. The present invention is a means of using the last portion of the electrical distribution system for high-speed communications to residential homes. An aggregation point interfaces a medium voltage power line with a point-of-presence, and a power line bridge enables flow of communications signals between the medium voltage power line and a low voltage power line across a distribution transformer.

BRIEF DESCRIPTION OF THE DRAWING

13. Additional objects and advantages of the present invention will be apparent in the following detailed description read in conjunction with the accompanying drawing figures.

DETAILED DESCRIPTION OF THE INVENTION

18. According to the present invention, the power delivery system is divided up into three communications channels when configured for high-speed communications:

1. the MV half loop,
2. the LV connection from the transformer to the home, and
3. the wiring within the home.

Figure 1:
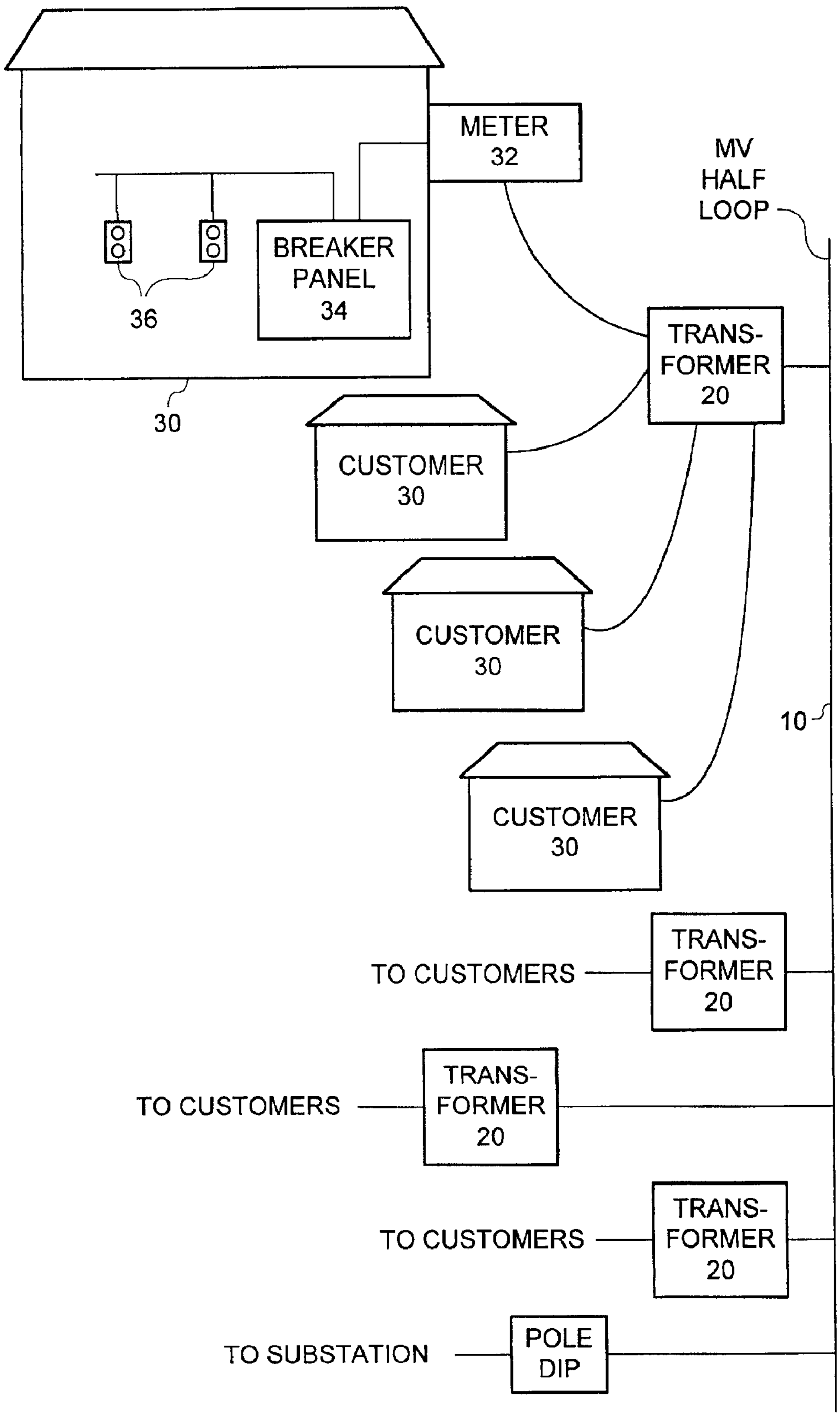
FIG. 1 illustrates topology of a typical electric power distribution system.
Figure 2:
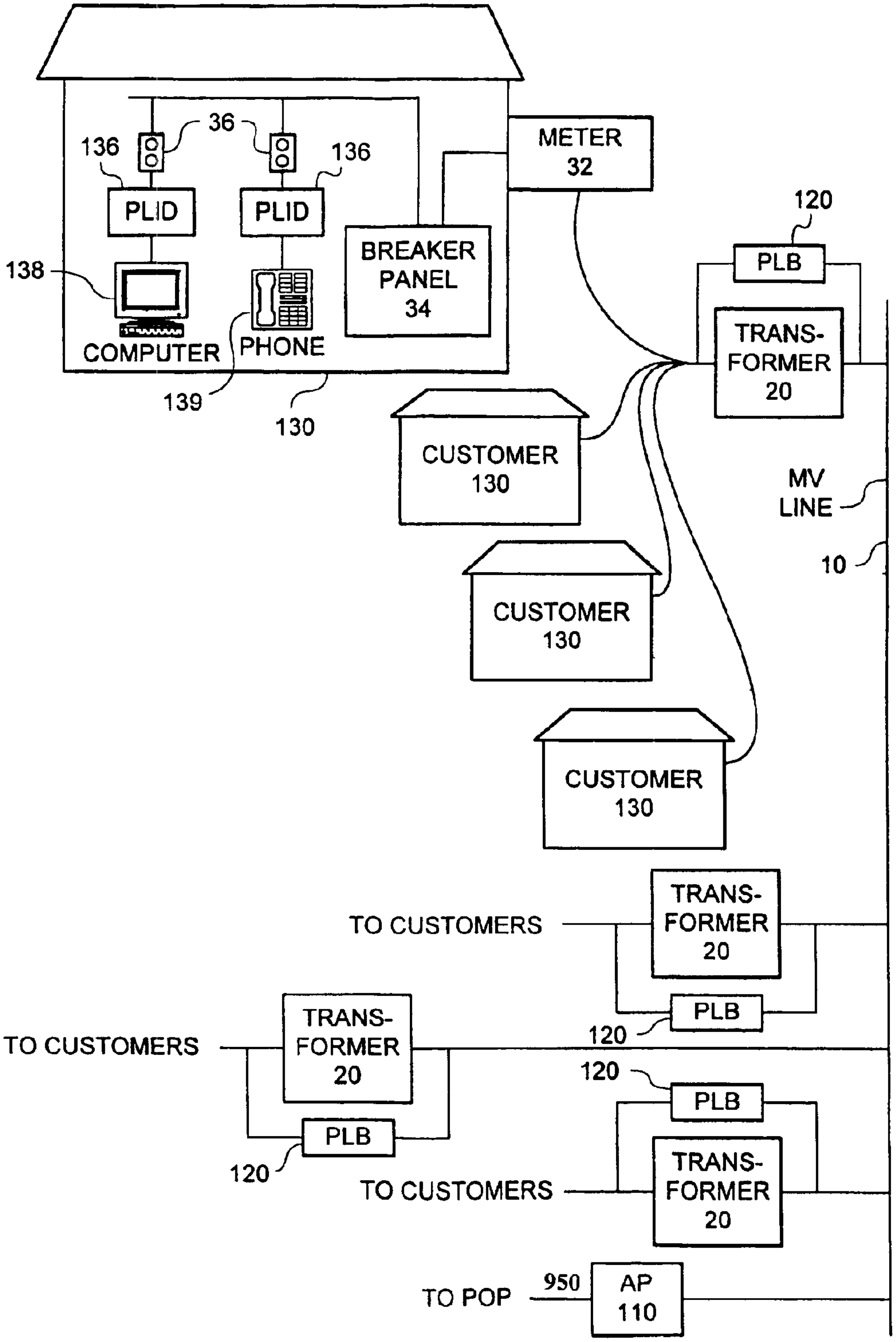
FIG. 2 illustrates topology of an electric distribution system modified to provide for communication, according to an embodiment of the present invention.

19. Referring to FIG. 2, a modification of the existing power distribution system for communications delivery is illustrated.

20. The first channel (the MV cable) 10 has the least amount of noise and least amount of reflections. This channel has the highest potential bandwidth for communications. This is important because it is the channel that concentrates all of the bandwidth from the other channels. The type of signal used on this channel can be almost any signal used in communications (CDMA, TDMA, FDM, OFDM to name a few). A wideband signal such as CDMA that is relatively flat in the spectral domain is preferred to minimize radiated interference to other systems while delivering high data rates. The first channel is fed by the AP (Aggregation Point) 110.

Figure 3:
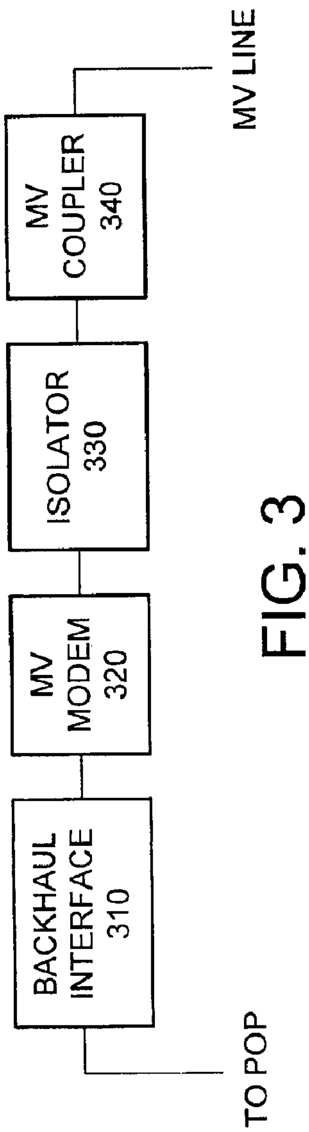
FIG. 3 illustrates a block diagram of an aggregation point according to an embodiment of the present invention.

21. Referring to FIG. 3, a block diagram of an AP according to an embodiment of the present invention is illustrated. The AP 300 communications to the outside world via the Point Of Presence (POP). The backhaul 950 to the POP can utilize any type of technology, such as optical fiber, copper, or a wireless link. The Backhaul Interface 310 connects the outside world to the MV modem 320. The MV modem 320 modulates/demodulates the data so that it can be transmitted over the MV cable. The isolator 330 is used as an extra safety measure since the voltages present in the system are relatively high. A preferred isolator structure is based on opto-coupling. The MV coupler 340 is used to prevent the medium voltage power passing from the MV line to the rest of the AP's circuits 310, 320, 330, while allowing the communications signal to pass to/from the AP 300 from/to the MV line.

22. The second channel (the LV connection from the transformer to the home) and the third channel (the wiring within the home) have noise present from electrical appliances and reflections due to the "web" of wires. These channels can support a lower bandwidth than the MV (first) channel and they need a more intelligent (i.e., with more overhead) modulation schemes. There are several companies with chip sets to achieve good communications for LANs (local Area Network) such as: Adaptive Networks (Newton, Mass.), Inari (Draper, Utah), Intellion (Ocala, Fla.), DS2 (Valencia, Spain) and Itran (Beer-Sheva, Israel). These devices would work well for the LV channels.

Figure 4:
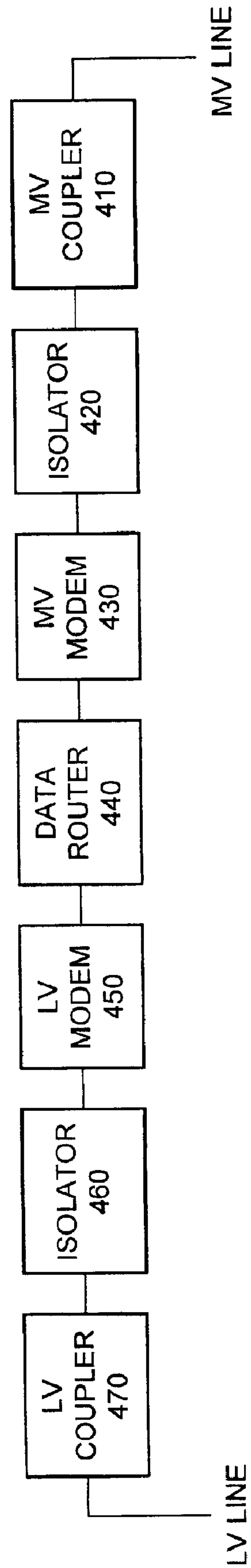
FIG. 4 illustrates a block diagram of a power line bridge according to an embodiment of the present invention.

23. Referring to FIG. 4, a block diagram of a Power Line Bridge (PLB) according to an embodiment of the present invention is illustrated. The PLB 400 shown, interfaces between the MV line on the primary of the transformer and the LV line on the secondary of the transformer. The MV coupler 410 is used to prevent the medium voltage power from passing to the rest of the PLB's circuits yet allowing the communications signal to pass to/from the PLB 400 from/to the MV line. The MV isolator 420 is used as an extra safety measure considering that the voltages present in the system are relatively high. A preferred Isolator 420 structure utilizes opto-coupling. The MV modem 430 modulates/demodulates the data so that it can be transmitted over the MV cable.

24. The data from/to the MV modem 430 is passed to the Data Router 440. The function of the Data Router 440 is to prioritize and gather packets from all of the LV side devices and pass them on to the MV side. The LV modem 450 modulates/demodulates the data so that it can be transmitted over the LV lines, this function utilizes powerline LAN chip set technology, as mentioned above. The LV isolator 460 and the LV coupler 470 serve the same function as the MV isolator 420 and the MV coupler 410, but on the LV side.

25. On the LV side of the transformer, the PLB 120 communicates with the Powerline Interface Devices (PLIDs) 136 at the customer location 130. A PLID 136 can have a variety of interfaces to the subscriber's equipment 138, 139. Some examples are RJ-11 Plain Old Telephone Service (POTS), RS-232, USB, and 10 Base-T. A subscriber can have multiple PLIDs 136 on the same internal wiring.

26. A system as disclosed herein is useful to provide data services to the residential market place at 10 Mbps. This makes an entire new range of applications practically available. Each device that is connected to the power would (if desired) have an address and would be accessible remotely. Some examples include remote utility meter reading, Internet Protocol (IP)-based stereo systems, IP-based video delivery systems, and IP telephony.

27. The present invention has been described in terms of preferred embodiments, however, it will be appreciated that various modifications and improvements may be made to the described embodiments without departing from the scope of the invention.

What is claimed is:

1. A system for providing communications over an electric power system having a medium voltage power line, a plurality of customer power lines with each extending to a customer residence, and a first transformer coupling the medium voltage power line to the customer power lines, the system comprising:

an aggregation device forming a portion of a data path between the medium voltage power line and a point of presence;

a first transformer bypass device communicatively coupled to the medium voltage power line and the plurality of customer power lines to provide a data path bypassing the first transformer;

said first transformer bypass device comprising a first modem communicatively coupled to the plurality of customer power lines and a second modem communicatively coupled to the medium voltage power line and said first modem;

a first isolation device forming at least part of a data path between said second modem and the medium voltage power line; and wherein data is communicated between said transformer bypass device and said aggregation device via the medium voltage power line.

2. The system of claim 1, wherein said aggregation device comprises;

a third modem communicatively coupled to the medium voltage power line.

3. The system of claim 2, wherein said aggregation device further comprises a coupling device forming at least part of a data path between said third modem and the medium voltage power line.

4. The system of claim 1, wherein said aggregation device is in communication with the point of presence, at least in part, via an optical fiber.

5. The system of claim 1, wherein said aggregation device is in communication with the point of presence, at least in part, via a wireless link.

6. The system of claim 1, further comprising:

a data router in communication with said first modem and said second modem.

7. The system of claim 6, wherein said data router is configured to prioritize transmission of data received from the customer power lines.

8. The system of claim 7, wherein said transformer bypass device communicates telephony data.

9. The system of claim 7, wherein said first modem communicates using Orthogonal Frequency Division Multiplexing.

10. The system of claim 1, wherein said aggregation device comprises:

a third modem communicatively coupled to the medium voltage power line and in communication with said second modem; and an isolation device forming at least part of a data path between said third modem and the medium voltage power line.

11. The system of claim 10, wherein said second modem and said third modem communicate telephony data.

12. The system of claim 10, wherein said second modem and said third modem communicate using Orthogonal Frequency Division Multiplexing.

13. The system of claim 1, wherein each of the customer power lines is coupled to a first set of communication devices and each of said communication devices has a unique address.

14. The system of claim 1, wherein said transformer bypass device communicates Internet data.

15. The system of claim 1, wherein said transformer bypass device communicates video data.

16. The system of claim 1, wherein the electric power system comprises a second transformer coupled to a second plurality of customer power lines communicatively coupled to a second set of communication devices, the system further comprising:

a second bypass device at a third location comprising:

a third modem communicatively coupled to the second plurality of customer power lines and in communication with said second set of communication devices;

a fourth modem communicatively coupled to the medium voltage power line; and a data router in communication with said third modem and said fourth modem.

17. The system of claim 1, wherein said first modem is in communication with a plurality of communication devices via the plurality of customer power lines.

18. The system of claim 17, wherein said bypass device further comprises a data router configured to prioritize data packets received from the plurality of communication devices for transmission on the medium voltage power line.

19. The system of claim 18, wherein said first modem uses Orthogonal Frequency Division Multiplexing.

20. A method of using a communication system for providing communications between at least one communication device and a point of presence, the system comprised of a bypass device and an aggregation device in communication with each other via a medium voltage power line, the bypass device in communication with the communication device via a first low voltage power line, the method comprising:

at the bypass device:

receiving a first data packet signal from the communication device via the first low voltage power line, demodulating said first data packet signal, modulating a signal based on said first data packet signal to form a second data packet signal, isolating the first low voltage power line from the medium voltage power line; and transmitting said second data packet signal through the medium voltage power line; and at the aggregation device:

receiving said second data packet signal from the medium voltage power line, demodulating said second data packet signal, and transmitting a third signal based on said second data packet signal to the point of presence.

21. The method of claim 20, further comprising:

at the bypass device:

receiving data signals from a plurality of communication devices; and prioritizing said received data signals at the bypass device.

22. The method of claim 20, wherein said first data packet signal comprises telephony data.

23. The method of claim 20, wherein said first data packet signal comprises Internet data.

24. The method of claim 20, wherein said first data packet signal comprises video data.

25. The method of claim 20, wherein said first data packet signal comprises audio data.

26. The method of claim 20, wherein said audio data comprises music data.

27. A transformer bypass device providing a communication path around a transformer between a medium voltage power line and at least one low voltage power line, comprising:

a first modem communicatively coupled to the low voltage power line;

a second modem in communication with said first modem and communicatively coupled to the medium voltage power line;

an isolation device disposed between said second modem and the medium voltage power line; and a data router in communication with said first modem and said second modem.

28. The device of claim 27, wherein the isolation device is an optical isolation device.

29. The device of claim 27, wherein said second modem uses Orthogonal Frequency Division Multiplexing.

30. The device of claim 29, wherein said first modem uses Orthogonal Frequency Division Multiplexing.

31. The device of claim 27, wherein said first modem uses Orthogonal Frequency Division Multiplexing.

32. The device of claim 27, wherein said second modem uses Code Division Multiple Access.

33. The device of claim 27, wherein the transformer bypass device is in communication with an aggregation device that comprises:

a third modem communicatively coupled to the medium voltage power line and in communication with said second modem of the transformer bypass device; and a transceiver in communication with said third modem and a point of presence.

34. The device of claim 27, wherein said first modem is communicatively coupled to a plurality of low voltage power lines and the low voltage power lines are coupled to a plurality of communication devices and each of said communication devices has a unique address.

35. The device of claim 34, wherein said data router is configured to prioritize transmission of data received from the communication devices.

36. The device of claim 27, wherein the transformer bypass device communicates telephony data.

37. The device of claim 27, wherein said first modem communicates using Orthogonal Frequency Division Multiplexing.

38. The device system of claim 27, wherein the transformer bypass device communicates Internet data.

39. The device of claim 27, wherein the transformer bypass device communicates video data.

40. The device of claim 27, further comprising a second transformer communicatively coupled to a second set of plurality of low voltage power lines communicatively coupled to a second set of communication devices, the device forming part of a system comprising:

a second bypass device comprising:

a third modem communicatively coupled to the second set of plurality of customer power lines and in communication with said second set of communication devices and each of said communication devices has a unique address;

a fourth modem communicatively coupled to the medium voltage power line; and a second data router in communication with said third modem and said fourth modem.

41. A communication device for providing data communications through a medium voltage power line, comprising:

a communication interface providing at least part of a communication path between the medium voltage power line and the Internet;

a coupling device communicatively coupled to the medium voltage power line;

a modem in communication with said communication interface and in communication with the medium voltage power line via said coupling device; and an isolator disposed between said modem and the medium voltage power line.

42. The device of claim 41, wherein said communication interface is configured to communicate via an optical fiber.

43. The device of claim 42, wherein said isolator is disposed between said modem and said coupling device.

44. The bypass device of claim 41, wherein said modem uses Orthogonal Frequency Division Multiplexing.

45. A method of communicating Internet packet data through a communication system to a communication device, the system comprised of a bypass device and a network interface device communicatively coupled to each other via a medium voltage power line, the bypass device in communication with the communication device via a first low voltage power line, the method comprising:

at the network interface device:

receiving a first packet of Internet data from a network, and transmitting said received first packet of Internet data through the medium voltage power line; and at the bypass device:

receiving said transmitted first packet of Internet data via the medium voltage power line, isolating the first low voltage power line from the medium voltage power line; and transmitting said first packet Internet of data through the low voltage power line to the communication device.

46. The method of claim 45, further comprising at the communication device receiving said first packet of Internet data.

47. A method of communicating telephony packet data through a communication system to a communication device, the system comprising of a bypass device and a network interface device communicatively coupled to each other via a medium voltage power line, the bypass device communicatively coupled to the communication device via a first low voltage power line, the method comprising:

at the network interface device:

receiving a first packet of telephony data from a network, and transmitting said received first packet of telephony data through the medium voltage power line; and at the bypass device:

receiving said transmitted first packet of telephony data on the medium voltage power line, isolating the first low voltage power line from the medium voltage power line; and transmitting said first packet of telephony data through the low voltage power line to the communication device.

48. The method of claim 47, further comprising:

at the communication device:

receiving said first packet of telephony data.

49. The method of claim 47, further comprising:

at the bypass device:

receiving a second transmitted packet of telephony data via the low voltage power line from the communication device, and transmitting said second packet of telephony data through the medium voltage power line; and at the network interface device:

receiving said second packet of telephony data from the medium voltage power line, and transmitting said second received packet of telephony data through the network.

* * * * *